United States Patent
Purcell et al.

(10) Patent No.: US 7,238,925 B2
(45) Date of Patent: Jul. 3, 2007

(54) COLUMN CURRENT SOURCE

(75) Inventors: Matthew Purcell, Edinburgh (GB);
Robert Henderson, Edinburgh (GB)

(73) Assignee: STMicroelectronics Ltd.,
Buckinghamshire (GB)

( * ) Notice: Subject to any disclaimer, the term of this patent is extended or adjusted under 35 U.S.C. 154(b) by 143 days.

(21) Appl. No.: 11/104,749

(22) Filed: Apr. 13, 2005

(65) Prior Publication Data
US 2005/0253043 A1    Nov. 17, 2005

(30) Foreign Application Priority Data
May 15, 2004  (EP)  .................................. 04252834

(51) Int. Cl.
*G09G 3/10*  (2006.01)
(52) U.S. Cl. ................. 250/208.1; 315/169.1
(58) Field of Classification Search ............ 250/208.1, 250/214 R, 370.08; 348/241
See application file for complete search history.

(56) References Cited

U.S. PATENT DOCUMENTS

| | | | |
|---|---|---|---|
| 6,617,565 B2* | 9/2003 | Wu ........................ 250/208.1 |
| 6,756,738 B2* | 6/2004 | Maede et al. ............ 315/169.1 |
| 6,762,398 B1* | 7/2004 | Tanaka .................... 250/208.1 |
| 7,060,958 B1* | 6/2006 | Ni ........................... 250/208.1 |
| 7,109,953 B2* | 9/2006 | Abe et al. .................... 345/76 |
| 2003/0011829 A1 | 1/2003 | Dierickx ..................... 358/513 |
| 2003/0018456 A1* | 1/2003 | Browne et al. ................ 703/2 |

FOREIGN PATENT DOCUMENTS

| EP | 0938229 | 8/1999 |
|---|---|---|
| EP | 1076453 | 2/2001 |

\* cited by examiner

*Primary Examiner*—Thanh X. Luu
*Assistant Examiner*—Tony Ko
(74) *Attorney, Agent, or Firm*—Lisa K. Jorgenson; Allen, Dyer, Doppelt, Milbrath & Gilchrist, P.A.

(57) ABSTRACT

An image sensor includes an array of pixels arranged in rows and columns. A reference current source provides the reference current to a transistor forming one half of a current mirror. Each column has a current source, which forms the other half of a current mirror. A switch is provided to selectively connect a resistance between ground and the transistor. When the resistance is connected, the transistor is starved of gate-source voltage, which reduces the current supplied by each current source.

20 Claims, 1 Drawing Sheet

COLUMN CURRENT SOURCE

FIELD OF THE INVENTION

The invention relates to the field of image sensors and in particular, but not exclusively, for improving the column current source for an image sensor.

BACKGROUND OF THE INVENTION

Image sensors traditionally are made up of an array of light sensitive pixels. The image sensor reads-out the value of each pixel to produce an image, and before the array of pixels is exposed to receive light, each pixel is reset.

As shown in prior art FIG. 1, a current column source ICOL is provided for each column to bias the pixels PIX of that column and, as such, reset their values. Each column current source ICOL is one half of a current mirror circuit. A diode connected transistor MBIAS makes up the other half of the current mirror and is common to each column current source ICOL. The current ICOLBIAS is mirrored at ICOL<1> to ICOL<col>.

The current column source ICOL is not required continuously during an imaging cycle, but only when the pixel values require to be reset for integration and readout. Consequently, to reduce power consumption, the circuit comprises two reference currents in parallel $I_1$ and $I_2$. A switch SW is provided for selectively connecting the reference current $I_2$. When the current sources are required, the switch is closed and ICOLBIAS is equal to $I_1+I_2$. When the current sources are not required, the switch SW is opened and ICOLBIAS is equal to $I_1$.

When switching between values of ICOLBIAS, there is an inherent lag associated with powering up and down of the array due to the associated parasitic capacitance of the array. It may take 5 μs or longer to switch between values of ICOLBIAS. As pixel arrays get larger, the parasitic capacitance increases and the time to switch between values of ICOLBIAS increases further.

SUMMARY OF THE INVENTION

According to a first aspect of the present invention there is provided an image sensor comprising an array of pixels arranged in rows and columns; a reference current source; a transistor forming one half of a current mirror; and a current source for each column which follows the reference current source. Each current source forms the other half of a current mirror. The image sensor may also include resistor means or resistance connected between ground and the transistor, and switch means or a switch selectively operable to short circuit the resistance so as to reduce the current provided by the reference current source.

It is traditional to refer to a "column" current source in an image sensor, but it should be appreciated that the orientation of the image sensor could be rotated without affecting the principal of the invention.

The resistor means may comprise a resistive element for each column. The resistor means may be a single resistive element.

The size of the circuit can be reduced by only using the resistive element common to each column current source. For example, a resistive element may comprise an NMOS transistor in its linear region. It is also possible to use a resistive element for each column of the array of pixels.

According to a second aspect of the present invention, there is provided a mobile device comprising an image sensor as described above. The mobile device may be a mobile phone having a camera including the image sensor.

According to a third aspect of the present invention, there is provided an optical pointing device comprising an image sensor as described above. The optical pointing device may be an optical mouse.

BRIEF DESCRIPTION OF THE DRAWINGS

Embodiments of the present invention will now be described with reference to the accompanying drawings, in which.

DETAILED DESCRIPTION OF THE PREFERRED EMBODIMENTS

Figure 1:
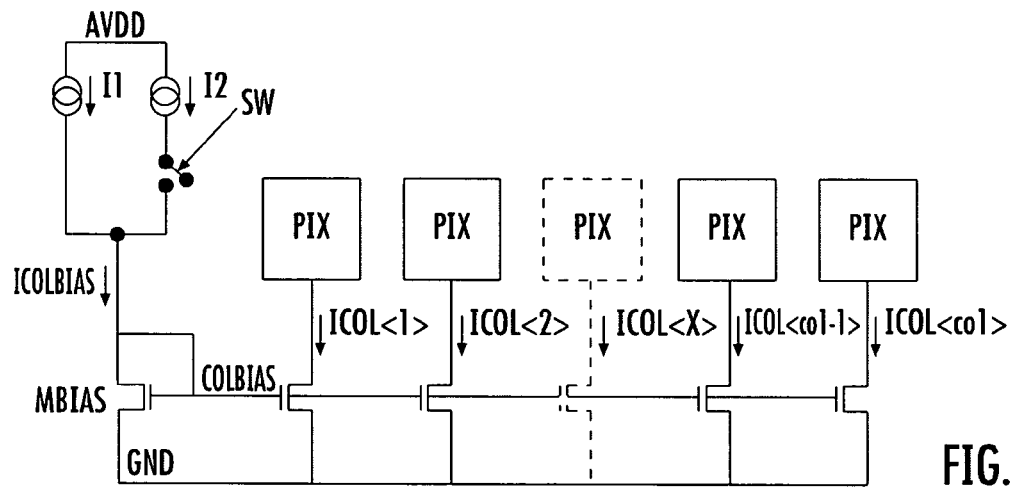
FIG. 1 shows a prior art column current source diagram.
Figure 2:
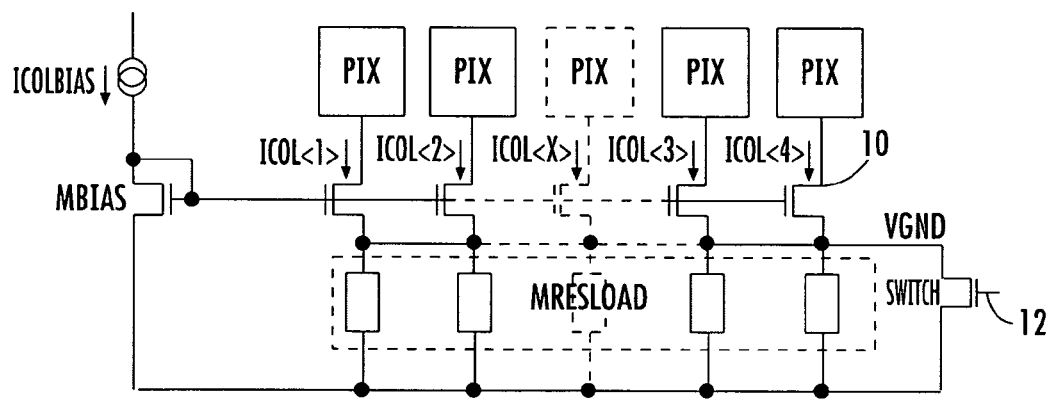
FIG. 2 shows a column current source diagram in accordance with the invention.

Referring to FIG. 2, a plurality of column current sources 10 are shown. Each column current source 10 has common elements being a diode connected transistor MBIAS, and reference current source ICOLBIAS thereby forming a current mirror. A series of resistors MRESLOAD are connected between each current column source 10 and the transistor MBIAS. A switch 12 is connected across the series of resistors MRESLOAD enabling a short across the series of resistors MRESLOAD.

When the column current sources 10 are required, the switch 12 is turned on shorting the series of resistors MRESLOAD and allowing the currents ICOL<1> to ICOL<4> to "mirror" ICOLBIAS. When the column current sources 10 are not required the switch 12 is turned off. The series of resistors MRESLOAD now have a potential difference across them which reduces the gate-source voltage of the transistor MBIAS. As the column current sources 10 and transistor MBIAS form a current mirror, the column current sources 10 mirror the gate-source voltage of MBIAS and therefore the currents ICOL<1> to ICOL<4> are reduced accordingly.

The series of resistors MRESLOAD may be replaced with a single resistor common to each column current source. This allows the footprint of the circuit to be reduced when applied in silicon.

That which is claimed is:

1. An image sensor comprising:
   an array of pixels arranged in rows and columns;
   a reference current source;
   at least one first transistor connected to said reference current source and forming a first half of a current mirror;
   a respective column current source for each column and connected to said at least one first transistor for forming a second half of the current mirror;
   at least one resistor connected between a reference voltage and said at least one first transistor; and
   at least one switch selectively operable to short circuit the at least one resistor for reducing current provided by said reference current source.

2. An image sensor according to claim 1 wherein said at least one resistor comprises a respective resistive element for each column.

3. An image sensor according to claim 1 wherein said at least one resistor comprises a single resistive element.

4. An image sensor according to claim 1 wherein each column current source comprises at least one second transistor.

5. An image sensor according to claim 1 wherein said at least one switch comprises at least one third transistor.

6. An image sensor comprising:
an array of pixels arranged in rows and columns;
a reference current source;
at least one first transistor connected to said reference current source and forming a first half of a current mirror;
a respective column current source for each column and connected to said at least one first transistor for forming a second half of the current mirror, each column current source comprising at least one second transistor;
at least one resistor connected between a reference voltage and said at least one first transistor; and
at least one third transistor switch selectively operable to short circuit the at least one resistor for reducing current provided by said reference current source.

7. An image sensor according to claim 6 wherein said at least one resistor comprises a respective resistive element for each column.

8. An image sensor according to claim 6 wherein said at least one resistor comprises a single resistive element.

9. An electronic device comprising:
a housing and an image sensor carried by said housing;
said image sensor comprising
an array of pixels arranged in rows and columns,
a reference current source,
at least one first transistor connected to said reference current source and forming a first half of a current mirror,
a respective column current source for each column and connected to said at least one first transistor for forming a second half of the current mirror,
at least one resistor connected between a reference voltage and said at least one first transistor, and
at least one switch selectively operable to short circuit the at least one resistor for reducing current provided by said reference current source.

10. An electronic device according to claim 9 wherein said at least one resistor comprises a respective resistive element for each column.

11. An electronic device according to claim 9 wherein said at least one resistor comprises a single resistive element.

12. An electronic device according to claim 9 wherein each column current source comprises at least one second transistor.

13. An electronic device according to claim 9 wherein said at least one switch comprises at least one third transistor.

14. An electronic device according to claim 9 further comprising a mobile device cooperating with the image sensor.

15. An electronic device according to claim 14 wherein said housing comprises a portable housing so that the electronic device comprises at least one of a mobile device and a movable pointing device.

16. A method of image sensing using an image sensor comprising an array of pixels arranged in rows and columns, a reference current source, at least one first transistor connected to the reference current source and forming a first half of a current mirror, a respective column current source for each column and connected to the at least one first transistor for forming a second half of the current mirror, at least one resistor connected between a reference voltage and the at least one first transistor, the method comprising:
selectively short circuiting the at least one resistor for reducing current provided by the reference current source.

17. The method according to claim 16 wherein the at least one resistor comprises a respective resistive element for each column.

18. The method according to claim 16 wherein the at least one resistor comprises a single resistive element.

19. The method according to claim 16 wherein each column current source comprises at least one second transistor.

20. The method according to claim 16 wherein the at least one switch comprises at least one third transistor.

* * * * *